Nov. 12, 1968
J. G. BUTTS
3,410,420
MOBILE TREE TRANSPLANTING MACHINE
Filed Jan. 26, 1967
4 Sheets-Sheet 1
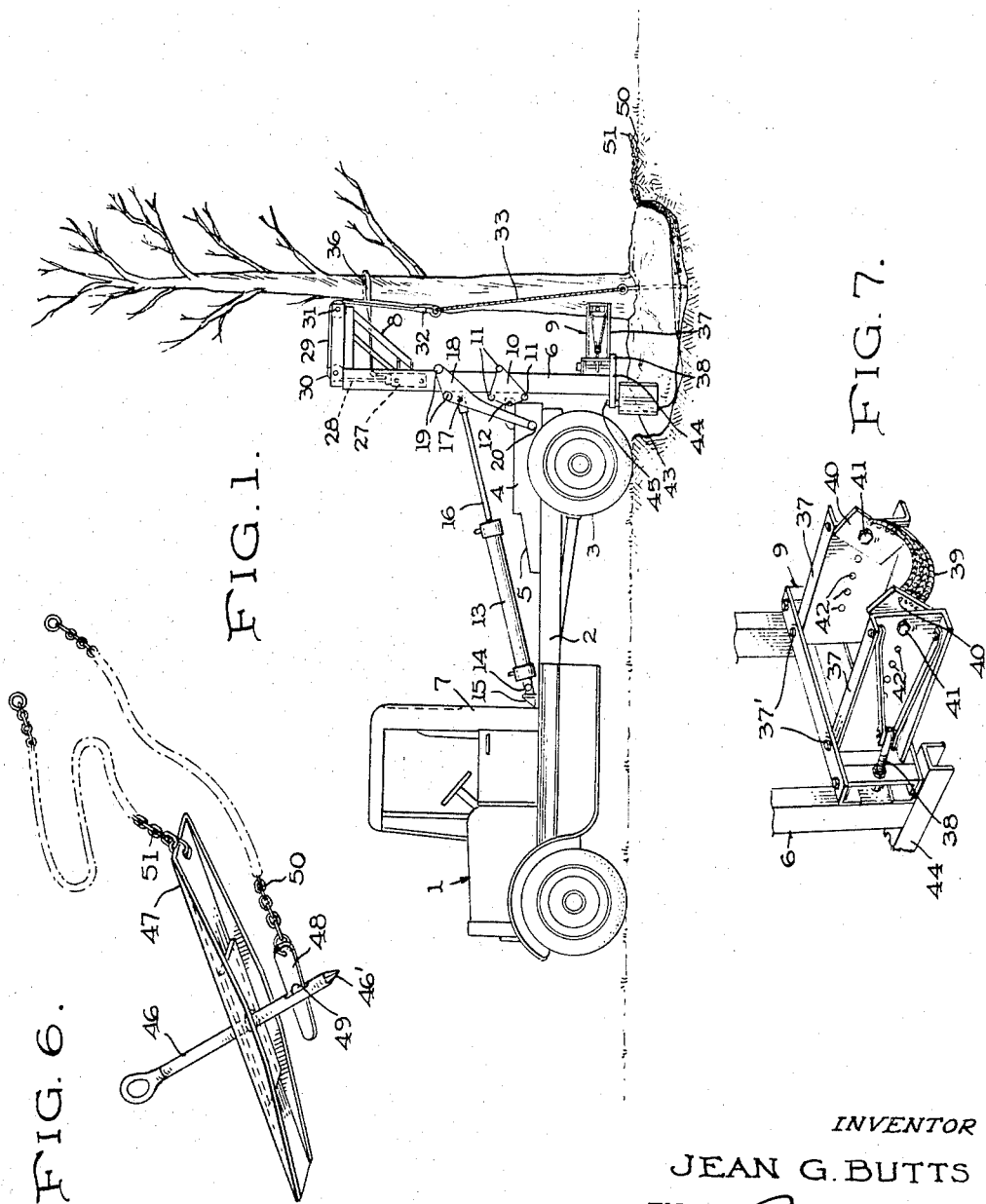
INVENTOR
JEAN G. BUTTS
BY
*Robt & Cobb*
ATTORNEYS Nov. 12, 1968
J. G. BUTTS
3,410,420
MOBILE TREE TRANSPLANTING MACHINE
Filed Jan. 26, 1967
4 Sheets-Sheet 2
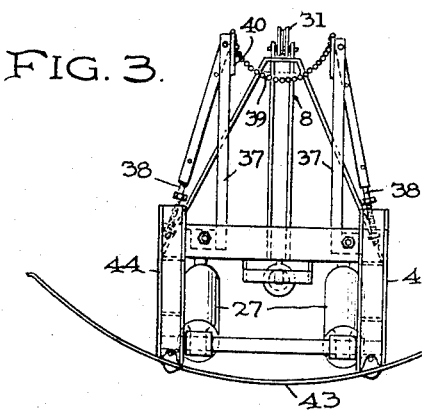
FIG. 3.
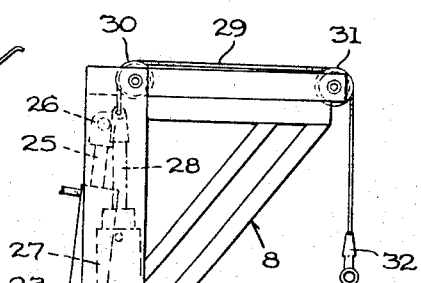
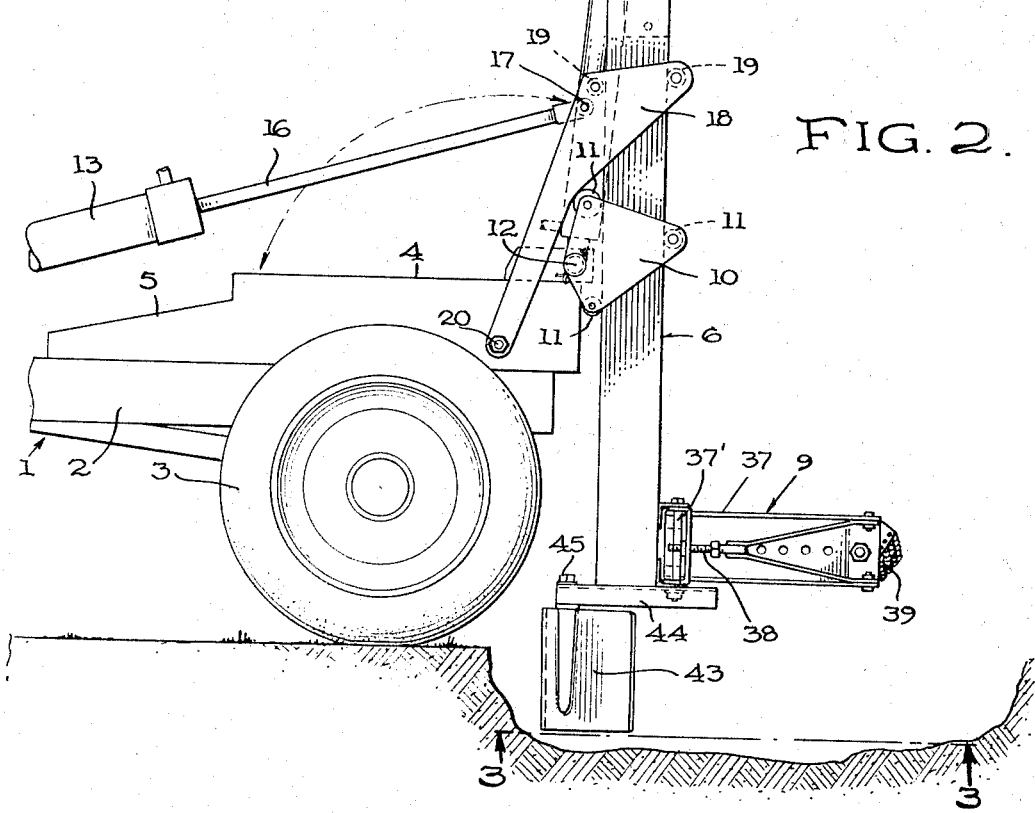
FIG. 2.
INVENTOR
JEAN G. BUTTS
BY
Robb & Robb
ATTORNEYS

INVENTOR
JEAN G. BUTTS
BY
ATTORNEYS

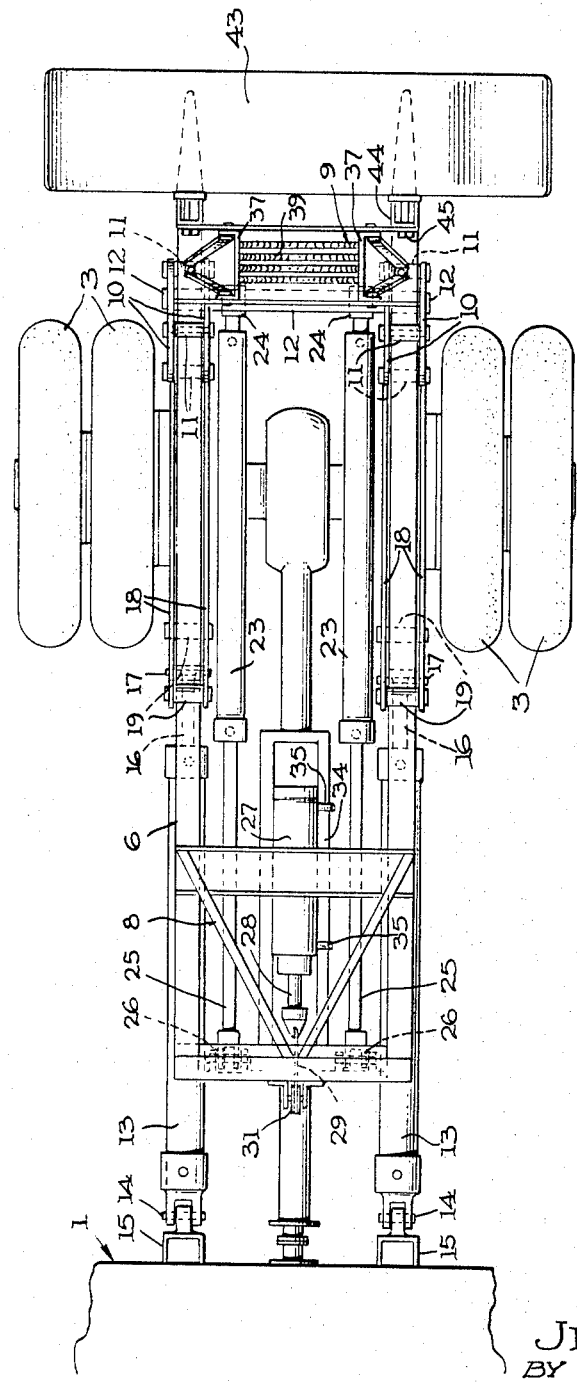

United States Patent Office 3,410,420
Patented Nov. 12, 1968

3,410,420
MOBILE TREE TRANSPLANTING MACHINE
Jean G. Butts, Cato, N.Y. 13033
Filed Jan. 26, 1967, Ser. No. 611,982
8 Claims. (Cl. 214—3)

ABSTRACT OF THE DISCLOSURE

The invention comprises a mobile tree lifting and transporting frame capable of rocking or pivotal movements in a vertical plane about a transverse axis, as well as capable of longitudinal movements relative to the transverse axis aforesaid, either in unison with the rocking or pivotal movements, or independently thereof, through the selective control of hydraulic power means operatively connected with the frame to control the movements thereof preparatory to securing a tree to the frame, subsequently lifting the tree to free it from the ground, and thereafter moving the tree to a relatively reclining position while transporting the tree to a new site, and finally repositioning and lowering the tree into an upright, reset position at a new site, all without injury or damage to the tree and while maintaining a sizable earth ball around the roots of the tree during the removal of the tree from the original site, as well as during transportation and resetting of the tree. The frame includes power operated hoist means which assists in stablizing the tree during removal, transportation and resetting thereof, and also includes an improved trunk engaging saddle and earth ball support means cooperative therewith, all contributing to stabilization of the tree during handling and transportation thereof.

---

The present invention relates to mobile tree transporting and transplanting machines, and more particularly to an improved machine of the general type disclosed in my prior Patent No. 2,130,117, issued Sept. 13, 1938 (now expired). While that machine has been quite successful, it is the primary objective of the present invention to simplify the construction thereof, as well as provide an improve, more powerful and more versatile power system for operating the tree lifting and supporting frame or carrier thereof.

A further object of the invention is to provide an improved mounting for the tree lifting and supporting frame which facilitates and expedites the removal of the tree from the ground with minimum injury or shock to the tree roots by the virtue of its ability to accommodate a sufficiently large ball of earth which remains around the roots as the tree is removed from its original site, transported to a new site and then reset at the new site. This objective is achieved by not only affording pivotal movement of the supporting frame or boom about an axis transverse thereto, but also affording longitudinal movement of the frame relative to the transverse pivotal axis thereof, with these movements being imparted to the supporting frame either independently or in unison, as controlled by selective power controls. By virtue of these combined movements, greater road clearance of the base end of the tree, with the earth ball around the roots, is achieved, and the weight thereof is better distributed on the vehicle during transportation of the tree.

A still further object of the invention is to provide improved means for securing the tree to the lifting and transporting frame aforesaid, said securing means including a powered hoist which is adapted to effectively act on the ball of earth about the tree roots in all positions of the frame to maintain the tree in lifting and transporting positions relative to the frame without injury or damage to the tree trunk.

Another object of the invention is to provide an improved and preferably adjustable load supporting cradle or saddle adjacent to the rear end of the lifting and transporting frame to engage the tree trunk near the base thereof and serving to bear the major load of the tree during lifting of the tree from the ground and during transportation of the tree to its new site and while resetting the same at the new site, said cradle preferably including an adjustable trunk engaging saddle and an adjustable earth ball supporting plate cooperative with the saddle.

Other and further objects and advantages of my invention will be hereinafter described or will become apparent from the following description and the accompanying drawings, and the novel features thereof defined in the appended claims.

In the drawings:

FIG. 1 is a view of my improved tree transporting and transplanting machine as seen in side elevation in a condition as attached to a tree ready to be lifted from the ground preparatory to transporting the tree to a new site;

FIG. 2 is a fragmentary view of the rear portion of the machine in its condition as in FIG. 1, with the tree omitted and the machine being shown on a somewhat enlarged scale;

FIG. 3 is a sectional view as taken on the line 3—3 of FIG. 2 looking upward from below the machine in the direction of the arrows;

FIG. 5 is a view of the machine in top plan, with the tree lifting and supporting frame or boom shifted to its horizontal tree transporting position;

Figure 4:
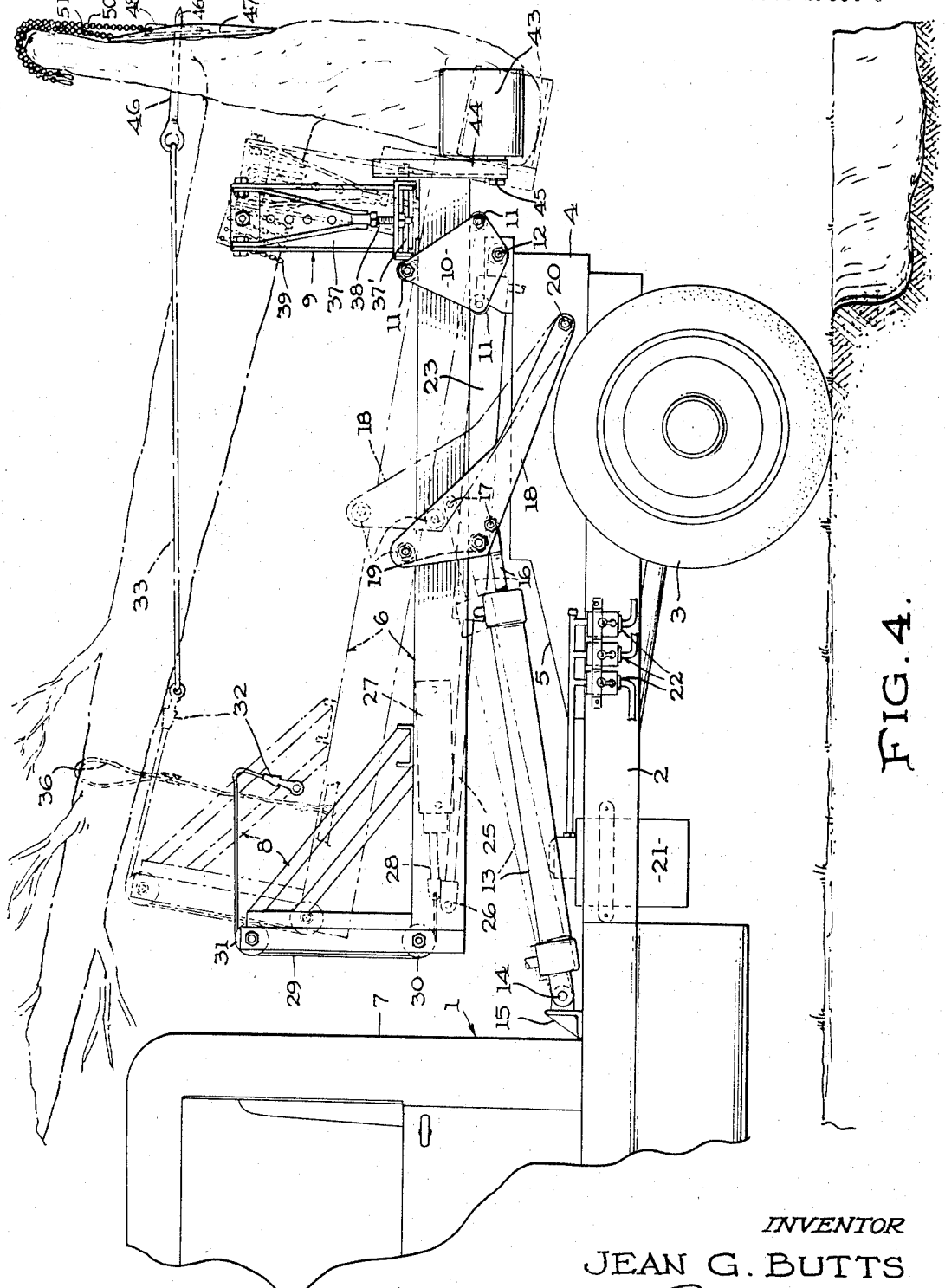
FIG. 4 is a view of the machine in side elevation, with the tree supporting and transporting frame being shown in broken lines in a partially forwardly tilted position and in full lines in its fully forwardly tilted or horizontal position.

FIG. 6 is a perspective view of one of the lifting pin and anchor plate assemblies which can be used to secure the earth ball at the base of the tree to the hoist cable on the tree lifting and transporting frame; and FIG. 7 is a fragmentary perspective view of the rear portion of the lifting and transporting frame or boom and showing the details of the cradle and saddle assembly which is engageable with the base of the tree near the ground level but above the earth ball.

Like reference characters designate corresponding elements in the various figures of the drawings, wherein 1 generally denotes a mobile vehicle on which my improved tree transporting and transplanting apparatus is mounted. The vehicle may be of any conventional type which includes a chassis frame 2 which has been cut off or otherwise modified so that the rear end of the chassis frame terminates approximately on a line immediately at the rear of the rear vehicle wheels 3, without extending substantially beyond the wheels. Mounted on and suitably anchored to the chassis 2 is a box-frame 4 extending across the rear end of the chassis 2 and forwardly thereof along opposite sides of the chassis to form a mounting base or bed elevated above the chassis. The forward portions of the box frame 4 are preferably tapered and inclined downwardly as at 5 to provide sufficient clearance for other parts of the apparatus to be hereinafter described.

Mounted on the base or bed 4 aforesaid is a tree lifting and carrier frame or boom 6 which is of generally rectangular form, but which is of greater longitudinal length than its transverse width and generally conforming to and overlying the outline of the chassis frame 2 at the rear of the vehicle cab 7 when the carrier frame is in its normal substantially horizontal tree transporting position. At the forward end of the carrier frame 6, it is provided with an A-frame as generally indicated at 8, said A-frame serving to engage the trunk of a tree substantially above the ground level, while the carrier frame 6 is provided at its rear end with a cradle assembly or saddle generally indicated at 9 to engage the tree trunk at or near the base thereof just above the ground level.

The carrier frame 6 is mounted on the bed 4 for rocking or tilting movements about a fixed axis transverse to the vehicle 1, as well as for sliding movements longitudinally of the vehicle, with the carrier frame being capable of assuming a substantially horizontal position when rocked or tilted forward to the limit in one direction, and capable of assuming a substantially vertical position when rocked or tilted rearward to the limit of its movement in the opposite direction. In its longitudinal sliding movements, the rear end of the carrier frame can be extended beyond the rear end of the vehicle and into the vicinity of the ground level as particularly shown in FIGS. 1 and 2, for reasons which will more fully appear hereinafter, while the forward end of the carrier frame can be brought close to the vehicle cab 7 when the frame is shifted longitudinally to its limit in the opposite (forward) direction.

To permit these movements of the carrier frame 6, the opposite longitudinal sides of the frame are slidingly embraced within brackets 10—10 at the respective opposite sides of the frame, said brackets having rollers 11 bearing on the upper and under surfaces of the frame, while the brackets are pivotally mounted on an axle or shaft 12 carried by and transversely extended across the supporting bed 4 formed by the box frame previously described.

Tilting or rocking movements are imparted to the carrier frame 6 by a pair of fluid motors 13—13 which may be of any suitable or conventional type, such as so-called double-acting hydraulic cylinders. As best seen in FIGS. 1, 4 and 5, the forward end of each hydraulic cylinder 13 is pivotally connected at 14 to an anchor bracket 15 which is in turn suitably anchored to the chassis frame 2 near the back of the cab 7. A piston rod 16 extends rearwardly from each cylinder 13 and is pivotally connected at 17 to a power lever 18 embracing the longitudinal side member of the carrier frame 6 so as to allow longitudinal sliding movements of the carrier frame relative to the power lever, as facilitated by rollers 19—19 mounted in each power lever at one end thereof and freely rolling on the upper and lower surfaces of the carrier frame. At the end of the power levers 18 opposite to the rollers 19—19, the power levers are respectively pivotally connected at 20 to the box frame or mounting bed 4 on the chassis frame 2. Accordingly, when hydraulic fluid from a hydraulic pump unit 21 (see FIG. 4) mounted on the chassis frame 2 and suitably powered by an appropriate power take-off (not shown) of the vehicle power system, or powered independently thereof if preferred, is admitted to either end of the fluid motors or hydraulic cylinders 13—13 under the control of one of a group of selector control valves 22 mounted on one side of the vehicle chassis frame 2 near the rear thereof, a powerful force is positively applied to the power levers 18—18 to swing the power levers in either direction about their respective pivots 20, and thus impart rocking or tilting movements in either direction to the carrier frame about the transverse axle or shaft 12.

Longitudinal sliding movements of the carrier frame 6 relative to the transverse pivot axle 12 of the brackets 10—10 is also effected by a second pair of fluid motors 23—23 preferably of the double-acting hydraulic cylinder type similar to the fluid motors 13—13, and selectively controlled by another one of the selector control valves 22 of the group previously referred to. One end of each hydraulic cylinder 23 is pivotally connected to the transverse axle or shaft 12, as at 24 while the piston rod 25 extending from the opposite end of each cylinder 23 is pivotally connected to the forward end of the carrier frame 6, as at 26. By admitting fluid into either end of the cylinders 23, pursuant to operation of the selector valve 22 therefor, the carrier frame can be shifted forwardly or rearwardly as desired when in any tilted or horizontal position, or upwardly or downwardly when in a vertical position. These movements can be produced independently of the tilting or rocking movements of the carrier frame, or can be controlled conjointly or simultaneously with the tilting or rocking movements, as the circumstances may dictate in the use of the machine.

Mounted on the forward or upper end of the carrier frame 6 is a hoist which preferably includes a single fluid motor 27, also of the double-acting hydraulic cylinder type similar to the motors 13 and 23, but preferably of larger diameter and shorter length, said motor 26 being selectively controlled by a third one of the group of selector control valves 22 aforesaid. The cylinder of the motor 27 is rigidly anchored to the carrier frame 6, while the piston rod 28 extended from the cylinder is connected to a flexible wire cable 29 leading over a pair of guide pulleys or sheaves 30, 31 rotably mounted on the frame 6, with the free end of the cable terminating in a connector shackle 32. The shackle in turn is detachably connectable to chains or cables 33 for suitably imparting a lifting action to the earth ball at the base of the tree, as will be more fully described. The mounting of the hoist motor 27 on the carrier frame 6 preferably includes a ladder structure 34 having rungs 35 to facilitate climbing of the operator to permit attachment of the carrier frame 6 to the trunk of the tree by means of a separate anchor cable or chain 36, and/or position the hoist cable 29 on the sheaves 30, 31 and connect the hoist cable to the lower anchor chains or cables 33.

The cradle or saddle assembly 9 mounted in the rear or lower end of the carrier frame 6, preferably comprises a pair of laterally spaced members 37 forming arms extended perpendicular to the frame 6 and which are pivotally connected thereto as at 37 to allow the arms to be adjusted in their spaced relation toward and away from each other as needed to fit the cradle to the trunk of the tree near or at about the ground level. This lateral pivotal adjustment of the arms 37 is achieved by adjusting bolts 38. Between the free ends of the arms is mounted a flexible band of cross chains 39 forming a web-like support which can closely conform to the shape of the tree trunk without injury to the latter. Padding can be interposed between the chains and the tree trunk if additional protection is desired. At each end of the cross chains 39, the chains are preferably anchored to a plate 40 which has a pivotal connection with the arm 37, as by a pivot bolt 41, and each arm 37 is also preferably provided with a series of bolt holes 42 to permit selective adjustment of the position of the chains relative to the free ends of the arms 37, according to the shape and size of the tree trunk.

Also at the rear or lower end of the carrier frame 6, beyond the cradle or saddle assembly 9, there is rigidly mounted thereon an arcuate earth ball retaining and supporting plate 43, said plate being curved laterally and extended coextensively beyond the end of the carrier frame. Adjustable hangers 44 are preferably provided to permit adjustment of the plate 43 toward and away from the cradle or saddle 9, as by means of selective positioning of adjusting bolts 45 in the hangers 44.

The use of my tree transporting and transplanting apparatus should be apparent from the foregoing description, taken in conjunction with the illustrations in the drawings, and generally corresponds to that described in my prior patent aforesaid. Briefly, the operation is as follows:

First, a trench is dug to a suitable depth around the base of the tree to be removed and transplanted, at a suitable distance from the tree trunk, depending on the size and type of tree, so that a considerable amount of soil or earth will be left around the tree roots when the tree is lifted out of the ground. In trenching around the tree, any long or heavy roots are cut off, but not too close to the base of the tree as to cause undue shock thereto or otherwise endanger its life. The earth can be undercut until the tree roots are free or substantially so, forming what is commonly referred to as a dirt or earth "ball" at the base of the tree. If desired, the ball can be encircled with mesh wire and/or burlap (not shown) to hold the earth firmly about the treet roots and to minimize loss thereof during lifting and transportation of the tree to the replanting site. The mobile vehicle 1 is then backed up to the edge of the trench to bring the carrier frame 6, which has previously been tilted to a substantially vertical position by means of the power controls, up close to the tree trunk, and then the carrier frame can be shifted by the power controls longitudinally in a rearward or downward direction until the earth ball supporting plate 43 extends to substantially the bottom of the trench, with the plate disposed relatively close to the marginal edge of the earth ball, as best illustrated in FIGS. 1 and 2. At this time, the tree is ready to be secured to the carrier frame 6, as by means of two or more anchor pins 46 driven through the earth ball at diametrically opposite sides of the tree trunk, with each pin extending through an anchor plate 47 inserted beneath the earth ball during the trenching and undercutting operation previously described. A latch pin or wedge 48 is inserted in a slot 49 provided in each pin near its pointed end 46'. A pull chain 50 is connected to the latch pin 48 and another pull chain 51 is connected to the anchor plate 47, said chains being of sufficient length so they can be extended from beneath the earth ball to the ground level beyond the ball so as to enable the latch pin to be released when desired after transplanting the tree and to enable the anchor plate to also be retrieved after withdrawal of the anchor pin 46 from the earth ball after the tree has been set in a hole provided at the transplanting site.

After anchoring the anchor pins to the earth ball, as described in the foregoing, and connecting the anchor cables or chains 33 thereto, the hoist motor 27 is operated by its selector valve 22 to impose a lifting strain on the tree, assisted simultaneously or at appropriate independent intervals by vertical sliding of the carrier frame 6 in an upward direction in response to action of the fluid motors 23—23 under control of their selector valve 22, until the tree and earth ball are completely free of the ground, whereupon the carrier frame is rocked or tilted forwardly by action of the motors 13—13 under control of their selector valve 22, accompanied by continued upward and forward longitudinal movement of the carrier frame, until the tree is inclined forwardly over the mobile vehicle 1 to a transporting position as generally indicated in FIG. 4, with the earth ball elevated well clear of the ground and resting on the supporting plate 43, and the trunk of the tree resting on the cradle 9 and against the A-frame 8. In such a position, the weight of the tree is well distributed on the vehicle for safe transportation to the new site.

At the new site, the vehicle is backed close to a pre-dug hole in which the earth ball is to be set, and the procedure described above is reversed to tilt the carrier frame 6 rearwardly while sliding the carrier frame rearwardly and downwardly until the carrier frame reaches a substantially vertical position as shown in FIGS. 1 and 2, and the tree assumes a normal vertical position, with the earth ball resting on the bottom of the hole. Removal of the anchor cables, anchor pin latches, the anchor pins and anchor plates can then be performed in an obvious manner, and the earth can be filled and repacked firmly around the base of the tree to complete the transplanting operation in the usual manner.

While the specific details have been herein shown and described, the invention is not confined thereto, as changes and alterations can be made without departing from the spirit thereof as defined in the appended claims.

I claim:

1. Tree transplanting apparatus of the class described, comprising a lifting and transporting frame, means for mounting said frame upon a mobile vehicle for pivotal movements of the frame forwardly and rearwardly about an axis transverse to the vehicle between substantially horizontal and vertical positions, respectively, as well as longitudinal movement of the frame relative to the pivotal axis aforesaid, means adjacent one end of the frame for engaging the trunk of a tree near the base thereof, hoist means mounted on the frame for imparting a lifting force to the tree, power means for imparting pivotal and longitudinal movements to the frame, control means for selectively controlling the power means, said frame mounting means including bracket means pivotally connected to the vehicle for rocking movements thereof about an axis transverse to the vehicle, said bracket means slidably embracing the frame so that the frame is shiftable longitudinally relative to the transverse pivotal axis of the bracket means, and power lever means pivotally connected to the vehicle at one end of the lever means and also slidably embracing the frame at the other end of the lever means for imparting pivotal movements to the frame about the transverse pivotal axis of the bracket means responsive to pivotal movements of the power lever means.

2. Apparatus as defined in claim 1, wherein the power means includes hydraulic power means mounted on the vehicle and operatively connected to the power lever means for imparting pivotal movements to the latter, and consequently to the frame.

3. Apparatus as defined in claim 1, wherein the power means includes hydraulic power means interposed between the pivotal axis of the bracket means and the frame for imparting longitudinal movements to the frame independently of the pivotal movements thereof.

4. Apparatus as defined in claim 1, wherein a cradle is carried by the rear end of the frame, said cradle including a pair of laterally spaced adjustable arms having a flexible tree trunk support connected thereto and extending transversely between the same to engage the base of the tree trunk near the ground.

5. Apparatus as defined in claim 1, wherein a cradle is carried by the rear end of the frame, said cradle including a pair of laterally spaced adjustable arms having a flexible tree trunk support connected thereto and extending transversely between the same to engage the base of the tree trunk near the ground, and a supporting plate carried by the frame and extended longitudinally therefrom to engage and support the tree and an earth ball about the tree roots below the ground level as the tree is lifted and tilted forwardly of the vehicle responsive to forward pivotal movement of the frame about the transverse pivotal axis of the latter.

6. Apparatus as defined in claim 1, wherein a cradle is carried by the rear end of the frame, said cradle including a pair of laterally spaced adjustable arms having a flexible tree trunk support connected thereto and extending transversely between the same to engage the base of the tree trunk near the ground, and a supporting plate carried by the frame and extended longitudinally therefrom to engage and support the tree and an earth ball about the tree roots below the ground level as the tree is lifted and tilted forwardly of the vehicle responsive to forward pivotal movement of the frame about the transverse pivotal axis of the latter, said plate being of arcuate form in a direction transversely of the vehicle to substantially conform to the marginal edge of the earth ball around the tree roots at the extreme base of the tree.

7. Apparatus as defined in claim 1, wherein a cradle is carried by the rear end of the frame, said cradle including a pair of laterally spaced adjustable arms having a flexible tree trunk support connected thereto and extending transversely between the same to engage the base of the tree trunk near the ground, and a supporting plate carried by the frame and extended longitudinally therefrom to engage and support the tree and an earth ball about the tree roots below the ground level as the tree is lifted and tilted forwardly of the vehicle responsive to forward movement of the frame about the transverse pivotal axis of the latter, said plate being of arcuate form in a direction transversely of the vehicle to substantially conform to the marginal edge of the earth ball around the tree roots at the extreme base of the tree, and said plate being adjustable in a direction perpendicular to the frame.

8. Apparatus as defined in claim 1, wherein the hoist means includes hydraulic power means carried by the frame, a hoist cable operatively connected to the hydraulic power means, and guide pulley means mounted on the forward end of the frame for engaging and guiding the hoist cable, combined with a plurality of anchor pins connected to the hoist cable, said pins being insertable through an earth ball around the tree roots at the extreme base of the tree, and an anchor plate for each pin, each anchor plate being engageable beneath the earth ball and having releasable interlocking engagement with its pin.

References Cited
UNITED STATES PATENTS

| | | |
|---|---|---|
| 1,335,931 | 4/1920 | Balsly. |
| 2,701,649 | 2/1955 | Hallstrom _____ 214—3 |
| 2,721,664 | 10/1955 | Barfield _____ 214—3 |

HUGO O. SCHULZ, *Primary Examiner.*